United States Patent [19]

You

[11] Patent Number: 5,858,320
[45] Date of Patent: Jan. 12, 1999

[54] PROCESS FOR PREPARING ULTRAFINE ALUMINUM SILICATE SALT PARTICLES

[76] Inventor: Kyu Jae You, 48, Nackdong-ri, Nam-myon, Jungsun-kun, Kangwon-do, Rep. of Korea

[21] Appl. No.: 988,323

[22] Filed: Dec. 10, 1997

[30] Foreign Application Priority Data

Dec. 12, 1996 [KR] Rep. of Korea ............... 96-64586

[51] Int. Cl.$^6$ .......................... B01D 53/02; C04B 14/04; C01B 33/26; B01J 21/08
[52] U.S. Cl. .................. 423/327.1; 95/118; 106/483; 423/327.1; 423/327.2; 423/328.1; 423/328.2; 423/328.3; 423/330.1; 423/331; 502/235; 502/237
[58] Field of Search ............... 423/327.1, 327.2, 423/328.1, 328.2, 328.3, 330.1, 331; 106/483; 95/118; 502/235, 237

[56] References Cited

U.S. PATENT DOCUMENTS

| | | | |
|---|---|---|---|
| Re. 30,568 | 4/1981 | Fitton ........................................ | 106/306 |
| 3,929,666 | 12/1975 | Aiba et al. ................................ | 252/317 |
| 4,272,500 | 6/1981 | Eggerding et al. ....................... | 423/327 |
| 4,384,046 | 5/1983 | Nakagami ................................ | 501/95 |
| 4,640,904 | 2/1987 | Hillig et al. ............................. | 501/128 |
| 4,684,652 | 8/1987 | Yoldas et al. ............................ | 423/327 |
| 4,774,068 | 9/1988 | Hiraiwa et al. .......................... | 423/327 |
| 5,424,258 | 6/1995 | Mangold et al. ......................... | 501/128 |
| 5,470,435 | 11/1995 | Rushmere et al. ....................... | 162/181.6 |

*Primary Examiner*—Gary P. Straub
*Assistant Examiner*—Cam N. Nguyen
*Attorney, Agent, or Firm*—Blakely Sokoloff Taylor & Zafman

[57] ABSTRACT

A process for preparing ultrafine aluminum silicate salt particles, said process comprising the steps of admixing a solution of aluminum chloride with water glass to form an aluminum silicate gel, adding a suspension of calcium and magnesium hydroxides into said aluminum silicate gel to form a calcium and magnesium salt of aluminum silicate, aging said calcium and magnesium salt of aluminum silicate by heating and agitating, neutralizing a mixture of a solution of sodium aluminate and water glass by adding hydrochloric acid to form another aluminum silicate gel, and admixing said another aluminum silicate gel into with aged calcium and magnesium salt of aluminum silicate, and simultaneously heating and agitating the resulting mixture.

4 Claims, No Drawings

PROCESS FOR PREPARING ULTRAFINE ALUMINUM SILICATE SALT PARTICLES

BACKGROUND OF THE INVENTION

The present invention relates to a process for the production of aluminum silicate salt particles, and in particular, to a process for the production of ultrafine aluminum silicate salt particles having a high BET surface area and oil-absorbability.

Powders having a high BET surface area, and oil- and liquid-absorbability, are strongly required as anti-consolidation agents for deliquescence materials such as table salt and fertilizers, carriers for agricultural chemicals and insecticides, and lagging materials. In addition, the demand for such powders having a high surface area and low affinity of the second aggregation is rapidly growing for use as fillers for various materials including rubbers, plastics, paints, and inks.

The aforementioned term "oil-absorbability" may be defined as the capacity of a powdery sample to absorb large amounts of oil, e.g. linseed oil, yet remain in a powdery phase.

Silicic acid anhydride (silicon dioxide), silicic acid, calcium silicate, and synthetic calcium carbonate are mainly used as inorganic powders having relatively high BET surface area and oil-absorbability in the industrial fields.

The silicon acid anhydride can be prepared by a so called dry process, which process may be categorized into a "flame process" and an "arc process". In the flame process, silicic acid anhydride may be prepared by decomposition of halogenated silicic compounds by means of oxyhydrogen flame, or by thermal decomposition of organic silicon compounds. A typical reaction equation of the thermal decomposition process is as follows:

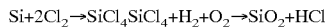

$$Si+2Cl_2 \rightarrow SiCl_4 \quad SiCl_4+H_2+O_2 \rightarrow SiO_2+HCl$$

In the arc process, a mixture of silica and coke is subjected to reduction by an arc and then to oxidation.

The silicic acid may be prepared by a so called wet process, in which sodium silicate is subjected to decomposition by an acid or an ammonium salt, or in which an alkaline earth metal salt derived from sodium silicate is subjected to decomposition by an acid. In addition, there is a so called organogel process, in which an organogel of silicon dioxide is converted to an aerogel in an autoclave. A typical reaction equation of the wet process is as follows:

$$Na_2O \cdot mSiO_2 + HCl + nH_2O \rightarrow mSiO_2 \cdot nH_2O + NaCl$$

The calcium silicate may be prepared by a so called wet process, in which silicic acid and a milk of lime is reacted in the presence of high pressure steam, the pressure involved in this process being in the range of 4 to 14 kg/cm². A typical reaction equation is as follows:

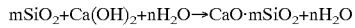

$$mSiO_2 + Ca(OH)_2 + nH_2O \rightarrow CaO \cdot mSiO_2 + nH_2O$$

The calcium silicate usually obtained in a conventional process, in which silicon compounds and calcium hydroxide are reacted in an autoclave, may be divided into tobermorite and xonotlite in accordance with its crystal configuration. The tobernorite and xonotlite calcium silicate may be produced under the condition of a pressure of 4 to 14 kg/cm² and a reaction time of 8 to 12 hours, and a pressure of 14 to 20 kg/cm² and a reaction time of 8 to 12 hours, respectively.

These calcium silicate powders are mainly used as a lagging material due to their relatively low BET surface area and oil-absorbability.

U.S. Pat. No. 4,572,827, issued to G. Flemmert, describes a process for preparing finely-divided silicon dioxide by reaction of silicon fluoride in the vapor phase with water vapor, combustible gas and free oxygen-containing gas in a flame reaction zone to form hydrogen fluoride and silicon dioxide entrained in a gaseous reaction mixture and rapidly cooling the gaseous reaction mixture and entrained silicon dioxide to a temperature below 700° C.

U.S. Pat. No. 4,790,486, issued to S. Eimaeda et al., discloses a process for preparing fine particles of hydrous silicic acid by neutralizing sodium silicate with sulfuric acid so that the proportion of particles having a particle size of 1 to 30 μm is at least 80% and the proportion of particles having a particle size of at least 70 μm is not more than 0.4%.

U.S. Pat. No. 4,629,508, issued to C. W. Cain Jr. et al., relates to a process for preparing hydrated calcium silicate, which process comprises reacting an aqueous slurry containing a source of calcium hydroxide, perlite as a source of silica, and a soluble calcium salt in the presence of high pressure saturated steam, then adding cooling water followed by subsequent venting of the reactor vessel to ambient pressure.

SUMMARY OF THE INVENTION

Accordingly, it is an object of the present invention to provide a process for preparing ultrafine aluminum silicate salt particles having a high BET surface area and oil-absorb ability.

Another object of the present invention is to provide a process for preparing ultrafine aluminum silicate salt particles exhibiting superior anti-consolidation properties, which are required in such products as table salt, fertilizers, carriers for insecticides, and lagging materials.

A further objective of the present invention is to provide a process for preparing ultrafine aluminum silicate salt particles which are suitable as fillers for rubbers, plastics, paints, and inks.

A still further objective of the present invention is to provide a process for preparing ultrafine aluminum silicate salt particles under ambient pressures, which process provides an economic advantage over high pressure processes.

Thus, the process of the present invention for preparing ultrafine aluminum silicate salt particles having a BET surface area of 400 to 500 m²/g and an oil-absorbability of 400 to 600 ml/100 g comprises the steps of admixing a solution of aluminum chloride with a soluble silicic acid-containing material to form an aluminum silicate gel, adding a suspension of calcium and magnesium hydroxides to said aluminum silicate gel to form a calcium and magnesium salt of aluminum silicate, aging the resulting mixture containing said calcium and magnesium salt of aluminum silicate by heating and agitation thereof neutralizing a mixture of a solution of sodium aluminate and a soluble silicic acid-containing material by adding hydrochloric acid to form another aluminum silicate gel, admixing said another aluminum silicate gel with said aged mixture containing said calcium another and magnesium salt of aluminum silicate, with simultaneous heating and agitation thereof, and recovering aluminum silicate salt particles from the resulting mixture of the second admixing.

DETAILED DESCRIPTION OF THE PREFERRED EMBODIMENT

The present invention will be described below in greater detail.

In the first step, a solution of aluminum chloride having a concentration of 3 to 8% by weight, based on $Al_2O_3$, and a temperature of 40° C. to 80° C., is added into a soluble silicate-containing material, e.g., water glass, having a concentration of 3 to 8% by weight and a temperature of 40° C. to 80° C., such that the molar ratio of $Al_2O_3$ to $SiO_2$ is in the range of 0.1 to 1.0/1. The mixture is agitated for 30 to 60 minutes to form an aluminum silicate gel.

In the second step, a suspension of calcium and magnesium hydroxides having a concentration of 3 to 8% by weight and a temperature of 40 ° C. to 80° C. is added to the aluminum silicate gel, and the resulting mixture is agitated for 30 to 60 minutes to form a calcium and magnesium salt of aluminum silicate, in which the molar ratio of $SiO_2$ plus $Al_2O_3$ to CaO plus MgO is in the range of 0.5 to 1.5/1, and the molar ratio of MgO to CaO is in the range of 0.1 to 0.5/1. The mixture containing the calcium and magnesium salt of aluminum silicate is then aged by heating it to a temperature of 80° C. to 95° C. and agitating it for 1 to 2 hours.

In the third step, water glass having a concentration of 3 to 8% by weight and a temperature of 40° C. to 80° C. is admixed with a solution of sodium aluminate having a concentration of 3 to 8% by weight and a temperature of 40° C. to 80° C. The resulting mixture is neutralized by adding hydrochloric acid such that an aluminum silicate gel is formed. This aluminum silicate gel is subsequently added to the aged mixture containing the calcium and magnesium salt of aluminum silicate. The resulting mixture is agitated for 30 to 60 minutes to prepare ultrafine aluminum silicate salt particles, in which the molar ratios of $SiO_2$ plus $Al_2O_3$ to CaO plus MgO, $Al_2O_3$ to $SiO_2$, and MgO to CaO are in the ranges of 1.5 to 3.5/1, 0.1 to 1.0/1, and 0.1 to 0.5/1, respectively.

In the fourth step, the mixture containing the aluminum silicate salt particles is subjected to washing, dehydrating, drying and pulverizing to obtain a dry product.

According to the aforementioned four steps, ultrafine aluminum silicate salt particles having a BET surface area of 400 to 500$m^2$/g and oil-absorbability of 400 to 600 ml/100 g are produced.

For a better understanding of the present invention, Examples and Comparative Examples are given below.

EXAMPLE 1

A solution of aluminum chloride having a concentration of 4% by weight, based on $Al_2O_3$, and a temperature of 50° C. was added into water glass No. 3 having a concentration of 4% by weight and a temperature of 50° C., so that the molar ratio of $Al_2O_3$ to $SiO_2$ was 0.2/1. The mixture was agitated for 40 minutes to form an aluminum silicate gel. A suspension of calcium and magnesium hydroxides having a concentration of 4% by weight and a temperature of 50° C. was added to the aluminum silicate gel, and the resulting mixture was agitated for 40 minutes to form a calcium and magnesium salt of aluminum silicate, in which the molar ratio of MgO to CaO was 0.3/1. The mixture containing the calcium and magnesium salt of aluminum silicate was then aged by heating it to a temperature of 90° C., and simultaneously agitating it for 1.5 hours.

Water glass No. 3 having a concentration of 4% by weight and a temperature of 50° C. was admixed with a solution of sodium aluminate having a concentration of 4% by weight, based on $Al_2O_3$, and a temperature of 50° C. The resulting mixture was neutralized by adding hydrochloric acid such that an aluminum silicate gel is formed. This aluminum silicate gel was then added to the aged mixture containing the calcium and magnesium salt of aluminum silicate. The resulting mixture was agitated for 40 minutes to prepare ultrafine aluminum silicate salt particles, in which the molar ratio of $SiO_2$ plus $Al_2O_3$ to CaO plus MgO was 2.0/1. The mixture containing the aluminum silicate salt particles was subjected to washing, dehydrating, drying and pulverizing to obtain a dry product having a BET surface area of 450 $m^2$/g and an oil-absorbability of 500 ml/100 g.

EXAMPLES 2 TO 5 and COMPARATIVE EXAMPLES 1 to 6

The detailed experimental conditions and results of the Examples and Comparative Examples are given in Table 1.

TABLE 1

| | First Reaction | | | | | | | | | | | |
|---|---|---|---|---|---|---|---|---|---|---|---|---|
| | water glass | | $AlCl_3$ | | $AlCl_3$/ $SiO_2$ | alkaline earth metal hydroxide | | | | MgO/ CaO | aging | |
| | | | | | | $Ca(OH)_2$ | | $Mg(OH)_2$ | | | | |
| Ex | T. °C. | C. % | T. °C. | C. % | molar ratio | T. °C. | C. % | T. °C. | C. % | molar ratio | T. °C. | Tm. hr |
| | 40–80 | 3–8 | 40–80 | 3–8 | 0.1–1.0/1 | 40–80 | 3–8 | 40–80 | 3–8 | 0.1–0.5/1 | 80–95 | 1–2 |
| 1 | 50 | 4 | 50 | 4 | 02./1 | 50 | 4 | 50 | 4 | 0.5/1 | 90 | 1.5 |
| 2 | 50 | 4 | 50 | 4 | 02./1 | 50 | 4 | 50 | 4 | 0.3/1 | 90 | 1.5 |
| 3 | 50 | 4 | 50 | 4 | 02./1 | 50 | 4 | 50 | 4 | 0.3/1 | 90 | 1.5 |
| 4 | 50 | 4 | 50 | 4 | 02./1 | 50 | 4 | 50 | 4 | 0.1/1 | 90 | 1.5 |
| 5 | 50 | 4 | 50 | 4 | 02./1 | 50 | 4 | 50 | 4 | 0.5/1 | 90 | 1.5 |
| 1 | 50 | 4 | 50 | 4 | 02./1 | 50 | 4 | 50 | 4 | 0.3/1 | 90 | 1.5 |
| 2 | 50 | 4 | 50 | 4 | 02./1 | 50 | 4 | 50 | 4 | 0.3/1 | 90 | 1.5 |
| 3 | 50 | 4 | 50 | 4 | 02./1 | 50 | 4 | 50 | 4 | 0.3/1 | 90 | 1.5 |
| 4 | 50 | 4 | 50 | 4 | 02./1 | 50 | 4 | 50 | 4 | 0.3/1 | 90 | 1.5 |
| 5 | 50 | 4 | 50 | 4 | 02./1 | 50 | 4 | 50 | 4 | 0.8/1 | 90 | 1.5 |
| 6 | Calcium silicate (Tobermorite) prepared by a conventional process, 4 kg/10 hr | | | | | | | | | | | |

TABLE 1-continued

| | First Reaction | Second Reaction | | | | | | | Property | |
|---|---|---|---|---|---|---|---|---|---|---|
| | SiO$_2$+Al$_2$O$_3$/CaCO+MgO | water glass | | sodium aluminate | | HCl | | SiO$_2$+Al$_2$O$_3$/CaCO+MgO | oil-absorption | |
| Ex. | molar ratio | T. °C. | C. % | T. °C. | C. % | T. °C. | C. % | molar ratio | BET m$^2$/g | ml/100 g |
| | 0.5–1.5/1 | 40–80 | 3–8 | 40–80 | 3–8 | 40–80 | 3–8 | 1.5–2.0/1 | 400– | 400– |
| 1 | 0.8/1 | 50 | 4 | 50 | 4 | 50 | 4 | 2.0/1 | 450 | 500 |
| 2 | 0.5/1 | 50 | 4 | 50 | 4 | 50 | 4 | 2.0/1 | 400 | 400 |
| 3 | 1.5/1 | 50 | 4 | 50 | 4 | 50 | 4 | 2.0/1 | 500 | 600 |
| 4 | 0.8/1 | 50 | 4 | 50 | 4 | 50 | 4 | 2.0/1 | 470 | 480 |
| 5 | 0.8/1 | 50 | 4 | 50 | 4 | 50 | 4 | 2.0/1 | 460 | 460 |
| 1 | 0.3/1 | 50 | 4 | 50 | 4 | 50 | 4 | 1.3/1 | 380 | 370 |
| 2 | 2.0/1 | 50 | 4 | 50 | 4 | 50 | 4 | 3.5/1 | 350 | 350 |
| 3 | 0.8/1 | 50 | 4 | 50 | 4 | 50 | 4 | 4.0/1 | 390 | 380 |
| 4 | 0.3/1 | 50 | 4 | 50 | 4 | 50 | 4 | 1.0/1 | 230 | 220 |
| 5 | 0.8/1 | 50 | 4 | 50 | 4 | 50 | 4 | 2.0/1 | 370 | 380 |
| 6 | Calcium silicate (Tobermorite) prepared by a conventional process, 4 kg/10 hr | | | | | | | | 120 | 130 |

The lower six runs are comparative examples.

Table 2 compares ultrafine particles of the aluminum silicate salt produced by the present inventive process with those produced by conventional methods.

TABLE 2

| | BET surface area (m$^2$/g) | Oil-absorbability (ml/100 g) |
|---|---|---|
| Silicic acid anhydride | 130 to 380 | 270 to 360 |
| Silicic acid | 100 to 300 | 150 to 300 |
| Calcium silicate | 80 to 150 | 100 to 200 |
| Colloidal calcium carbonate | 15 to 100 | 20 to 40 |
| Inventive Product | 400 to 500 | 400 to 600 |

It is evident from the foregoing that the process according to the present invention provides ultrafine aluminum silicate salt particles having a high BET surface area and oil-absorbability.

The ultrafine aluminum silicate salt particles produced by the process of the present invention have superior anti-consolidation properties, which are required in such products as table salt, liquid fertilizers, carriers for insecticides and lagging materials. In addition, they may be used as fillers for rubbers, plastics, paints, and inks.

What is claimed is:

1. A process for preparing ultrafine aluminum silicate salt particles having a BET surface area of 400 to 500 m$^2$/g and an oil-absorbability of 400 to 600 ml/100 g, said process comprising the steps of:

a first admixing of a solution of aluminum chloride with a soluble silicic acid-containing material to form a first aluminum silicate gel;

adding a suspension of calcium and magnesium hydroxides to said first aluminum silicate gel to form a calcium and magnesium salt of aluminum silicate;

aging the resulting mixture containing said calcium and magnesium salt of aluminum silicate by heating and agitation thereof;

neutralizing a mixture of a solution of sodium aluminate and a soluble silicic acid-containing material by adding hydrochloric acid to form a second aluminum silicate gel; a second admixing of said second aluminum silicate gel with said aged mixture containing said calcium and magnesium salt of aluminum silicate with simultaneous heating and agitation thereof; and recovering aluminum silicate salt particles from the resulting mixture of said second admixing.

2. The process of claim 1, wherein said soluble silicic acid-containing material in the first admixing step and in the neutralizing step is water glass.

3. The process of claim 1, wherein the molar ratio of SiO$_2$ plus Al$_2$O$_3$ to CaO plus MgO in said calcium and magnesium salt of aluminum silicate is in the range of 0.5 to 1.5/1.

4. The process of claim 1, wherein the molar ratios of SiO$_2$ plus Al$_2$O$_3$ to CaO plus MgO, Al$_2$O$_3$ to SiO$_2$, and MgO to CaO in said aluminum silicate salt are in the ranges of 1.5 to 3.5/1, 0.1 to 1.0/1, and 0.1 to 0.5/1, respectively.

* * * * *

UNITED STATES PATENT AND TRADEMARK OFFICE
CERTIFICATE OF CORRECTION

PATENT NO.   : 5,858,320
DATED        : January 12, 1999
INVENTOR(S)  : You

Page 1 of 1

It is certified that error appears in the above-identified patent and that said Letters Patent is hereby corrected as shown below:

Column 1,
Line 34, delete "Si+2Cl$_2$→SiCl$_4$SiCl$_4$+H$_2$+O$_2$→SiO$_2$+HCl" and insert:
--Si+2Cl$_2$→SiCl$_4$ SiCl$_4$+H$_2$+O$_2$→SiO$_2$+HCl --.

Column 2,
Line 30, delete "oil-absorb ability" and insert -- oil-absorb-ability --.
Line 55, delete" agitation thereof neutralizing" and insert -- agitation thereof, neutralizing --.
Line 59, delete "said calieium another and magnesium" and insert -- said calcium and magnesium --.

Column 11, table 1,
In the row marked Example 1, delete "0.5/1" and insert -- 0.3/1 --.

Column 2, table 1,
Delete "SiO$_2$+Al$_2$O$_3$/CaCo+MgO" and insert SiO$_2$+Al$_2$O$_3$/CaO+MgO --.

Column 9, table 1,
Delete "SiO$_2$+Al$_2$O$_3$/CaCO+MgO" and insert --SiO$_2$+Al$_2$O$_3$/CaO+MgO --.
In the row directly above Example 1, delete "1.5-" and insert -- 1:5-3.5/1 --.

Column 10, table 1,
In the row directly above Example 1, delete "400-" and insert -- 400-500 --.

Column 11, table 1,
In the row directly above Example 1, delete "400-" and insert -- 400-600 --.

Signed and Sealed this

Twenty-first Day of August, 2001

*Attest:*

Nicholas P. Godici

*Attesting Officer*

NICHOLAS P. GODICI
*Acting Director of the United States Patent and Trademark Office*